UNITED STATES PATENT OFFICE 2,132,872

AZO COMPOUNDS AND PROCESS FOR DYEING THEREWITH

James G. McNally and Joseph B. Dickey, Rochester, N. Y., assignors to Eastman Kodak Company, Rochester, N. Y., a corporation of New Jersey No Drawing. Application October 8, 1936, Serial No. 104,713

19 Claims. (Cl. 8—50)

This invention relates to aryl azo compounds. More particularly it relates to nuclear non-sulfonated aryl azo compounds suitable for the coloration of organic derivatives of cellulose. The invention includes the azo compounds, the process for their preparation, the process of coloring with them, and materials colored with the azo compounds of the invention.

Organic derivatives of cellulose are characterized by an indifferent affinity for the usual cotton or wool dyes, especially the ordinary water-soluble dyes. Typical organic derivatives of cellulose include the hydrolyzed as well as the unhydrolyzed cellulose organic acid esters, such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose.

We have discovered that a valuable series of aryl azo compounds can be obtained by coupling aryl diazonium salts with compounds of the type represented by the formula:

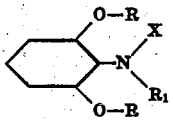

wherein R and $R_1$ represent an alkyl group or a substituted alkyl group, such as a hydroxyalkyl or alkoxyalkyl group, and X represents hydrogen, an alkyl group or a substituted alkyl group, such as an alkoxyalkyl or a hydroxyalkyl group. The compounds of our invention have the probable formula:

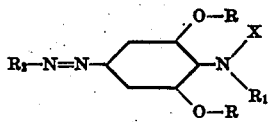

wherein R, $R_1$ and X have the meaning above given and $R_2$ represents an aryl nucleus. Advantageously, $R_2$ is an aryl nucleus of the benzene series.

The nuclear non-sulfonated aryl azo compounds of the invention constitute valuable dyes which may be employed for the dyeing or coloration of materials made of or containing organic derivatives of cellulose. The dyeings produced employing said nuclear non-sulfonated aryl azo compounds are in general of good fastness to light and washing, and range in shade from yellow to blue.

The following examples illustrate the method of preparation of the azo compounds of our invention. Quantities are expressed in parts by weight.

EXAMPLE 1

17.2 parts of p-bromoaniline are dissolved in 150 parts of water and about 29.7 parts of 36% hydrochloric acid. The resulting solution is cooled to a temperature approximating 0–5° C. by the addition of ice, for example, and diazotized by the addition of 6.9 parts of sodium nitrite dissolved in water.

19.7 parts of 2,6-dimethoxy-β-hydroxyethylaniline are dissolved in 105 parts of glacial acetic acid. The resulting solution is cooled and the diazonium solution prepared above is added with stirring. Sodium acetate is then added until the solution is neutral to Congo red paper. When coupling is complete, the desired azo compound is precipitated with water, filtered, washed with water, and dried.

EXAMPLE 2

16.8 parts of 2-methoxy-4-nitroaniline are dissolved by warming in 200 parts of water containing about 36 parts of 36% hydrochloric acid. The resulting solution is iced and the mixture diazotized by the addition of 6.9 parts of sodium nitrite dissolved in water.

24.1 parts of 2,6-dimethoxy-di-β-hydroxyethylaniline are dissolved in 105 parts of glacial acetic acid. The resulting solution is cooled and the diazo solution prepared above added with stirring. Sodium acetate is then added until the mixture is neutral to Congo red paper. Upon completion of the coupling reaction, the desired azo compound is precipitated with water, filtered, washed and dried.

EXAMPLE 3

(A) 7.6 parts of powdered sodium nitrite are dissolved in 97 parts of cold 100% sulfuric acid. Following the addition of the sodium nitrite, the solution is warmed to a temperature not exceeding 70° C. and then cooled to 10–15° C.

(B) 18.3 parts of 2,4-dinitroaniline are dissolved in about 231 parts of hot glacial acetic acid and the hot acetic acid solution then cooled as rapidly as possible to room temperature.

Solution A is stirred while adding the mixture prepared in B. The addition requires 30 to 45 minutes and during the addition a temperature of from 10 to 15° C. should be maintained. After the addition of the mixture prepared in B to the solution of A, the resulting solution is stirred for 30 minutes and one part of urea is added to remove any excess nitrous acid.

The diazo solution thus prepared is added to a solution of 24.1 parts of 2,6-dimethoxy-di-β-hydroxyethylaniline in 105 parts of glacial acetic acid. The coupling reaction is carried out with stirring and while maintaining the solution in a cool condition. Sodium acetate is then added until the mixture is neutral to Congo red paper. Upon completion of the coupling reaction, the desired azo compound is precipitated with water, filtered, washed and dried.

EXAMPLE 4

13.8 parts of p-nitroaniline are added to 200 parts of water containing about 36 parts of 36% hydrochloric acid. The resulting solution is then cooled to a temperature approximating 0–5° C. and the p-nitroaniline diazotized by the addition of 6.9 parts of sodium nitrite.

25.5 parts of 2-methoxy-6-ethoxyethoxyl-β-hydroxyethylaniline

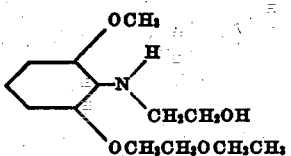

are dissolved in cold dilute hydrochloric acid and the diazotized p-nitroaniline solution is slowly added with stirring. After standing for a time, the resulting mixture is slowly made neutral to Congo red paper by the addition of sodium acetate. Upon completion of the coupling reaction, the dye compound formed is recovered by filtration, washed with water and dried.

EXAMPLE 5

21.7 parts of p-nitro-o-bromoaniline are diazotized with sodium nitrite and coupled in a cold dilute hydrochloric acid solution with 27.1 parts of

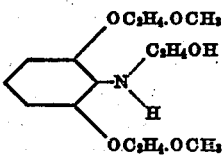

When coupling is complete, the dye compound formed is recovered by filtration, washed with water and dried.

EXAMPLE 6

17.3 parts of p-nitro-o-chloroaniline or diazotized with sodium nitrite and coupled in a cold dilute hydrochloric acid solution with 29.9 parts of

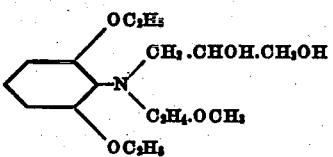

Upon completion of the coupling reaction, the dye compound formed is recovered by filtration, washed with water and dried.

Compounds represented by the general formula:

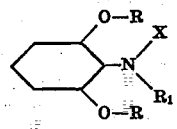

wherein R, $R_1$ and X have the meaning previously assigned to them, may be prepared by alkylating by known methods the corresponding dioxynitrobenzenes, reducing the nitro group to an amino group and subjecting the compound thus obtained to treatment appropriate to produce the desired substitution of the amino group. Hydroxyalkyl groups may be substituted on the amino group by oxalkylation with ethylene chlorohydrin or trimethylene chlorohydrin, for example.

In order that our invention may be fully understood, the preparation of a number of substances which may be employed in the production of compounds having the formula just given is disclosed herein. It will be understood, however, that the substances specifically disclosed are merely illustrative and not limiting as other similar substances, for example, may be employed.

*Preparation of 2-nitroresorcinol*

This compound may be prepared as described in the Journal of the American Chemical Society, vol. 55, page 4226 (1933) or Berichte der Deutschen Chemischen Gesellschaft, vol. 37, page 726 (1905). This compound may be employed as the initial material from which the coupling components of the present invention can be prepared as described above.

*Preparation of 2-nitro-1,3-resorcinol dimethyl ether*

This compound can be prepared as described in the Journal of the American Chemical Society, vol. 55, pages 4226 and 4227 (1933).

*Preparation of 2-amino-1,3-resorcinol dimethyl ether*

This compound can be prepared as described in the Journal of the American Chemical Society, vol. 55, page 4227 (1933) or Berichte der Deutschen Chemischen Gesellschaft vol. 40, pages 4005 and 4006 (1907).

*Preparation of 2-methoxy-6-ethoxynitrobenzene*

155 grams of 2-nitroresorcinol are dissolved in a dilute aqueous sodium hydroxide solution, the resulting solution is heated to boiling, and a mixture of 156 grams of methyl iodide and 173 grams of ethyl iodide is slowly added. 2-methoxy-6-ethoxynitrobenzene separates and may be recovered by filtration. The 2-methoxy-6-ethoxynitrobenzene may be reduced to the amino compound by known methods and subjected to appropriate treatment to substitute an alkyl, alkoxyalkyl or hydroxyalkyl group on the amino group.

*Preparation of*

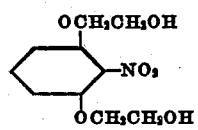

155 grams of 2-nitroresorcinol are refluxed in toluene with 150 grams of sodium carbonate and 200 grams of ethylene chlorohydrin for about 20 hours. When the reaction is complete the mixture is extracted with water and then with a dilute aqueous solution of sodium hydroxide. The extract is removed and the desired product recovered from the remaining toluene fraction by evaporating the toluene. The amino compound can be prepared by reducing the nitro group and the amino group substituted in accordance with the invention.

The following tabulation further illustrates the compounds included within the scope of our invention together with the color they produce on cellulose acetate silk. The compounds indicated below may be prepared by diazotizing the amines listed under the heading "Amine" and coupling with the compounds specified in the column entitled "Coupling component." The diazotization and coupling reactions may, for example, be carried out following the general procedure described in Examples 1 to 6, inclusive.

employed. In accordance with the usual dyeing practice, the material to be dyed will ordinarily be added to the aqueous dye bath at a temperature lower than that at which the main portion of the dyeing is to be effected, a temperature approximating 45–55° C., for example, following which the temperature of the dye bath will be raised to that selected for carrying out the dyeing operation. The temperature at which the dyeing is conducted will vary somewhat, depending, for example, on the particular material or materials undergoing coloration.

It will be understood that the azo compounds of our invention may be applied to the material to be colored in any suitable manner. Coloration may be effected, for example, by dyeing, printing, or stenciling. Dispersing or solubilizing agents that can be employed for preparing suspensions

| Amine | Coupling component | Color on cellulose acetate silk |
|---|---|---|
| o-Chloroaniline | 2,6-dimethoxy-β-hydroxyethylaniline | Yellow. |
| Do | 2,6-dimethoxy-di-β-hydroxyethylaniline | Do. |
| Do | 2,6-diethoxy-di-β-hydroxyethylaniline | Do. |
| p-Bromoaniline | 2,6-dimethoxy-β-hydroxyethylaniline | Orange yellow. |
| Do | 2,6-dimethoxy-di-β-hydroxyethylaniline | Do. |
| Do | 2,6-diethoxy-di-β-hydroxyethylaniline | Do. |
| 2-methyl-4-nitroaniline | 2,6-dimethoxy-β-hydroxyethylaniline | Orange red. |
| Do | 2,6-dimethoxy-di-β-hydroxyethylaniline | Red. |
| Do | 2,6-diethoxy-di-β-hydroxyethylaniline | Do. |
| 2-methoxy-4-nitroaniline | 2,6-dimethoxy-β-hydroxyethylaniline | Orange red. |
| Do | 2,6-dimethoxy-di-β-hydroxyethylaniline | Red. |
| Do | 2,6-diethoxy-di-β-hydroxyethylaniline | Do. |
| p-Nitroaniline | 2,6-dimethoxy-β-hydroxyethylaniline | Orange red. |
| Do | 2,6-dimethoxy-di-β-hydroxyethylaniline | Red. |
| Do | 2,6-diethoxy-di-β-hydroxyethylaniline | Do. |
| m-Nitroaniline | 2,6-dimethoxy-β-hydroxyethylaniline | Yellow. |
| Do | 2,6-dimethoxy-di-β-hydroxyethylaniline | Orange yellow. |
| Do | 2,6-diethoxy-di-β-hydroxyethylaniline | Do. |
| o-Nitroaniline | 2,6-dimethoxy-β-hydroxyethylaniline | Orange. |
| Do | 2,6-dimethoxy-di-β-hydroxyethylaniline | Do. |
| Do | 2,6-diethoxy-di-β-hydroxyethylaniline | Do. |
| 2,4-dinitroaniline | 2,6-dimethoxy-β-hydroxyethylaniline | Red. |
| Do | 2,6-dimethoxy-di-β-hydroxyethylaniline | Scarlet. |
| Do | 2,6-diethoxy-di-β-hydroxyethylaniline | Do. |
| 2,4,6-trinitroaniline | 2,6-dimethoxy-β-hydroxyethylaniline | Red. |
| Do | 2,6-dimethoxy-di-β-hydroxyethylaniline | Scarlet. |
| Do | 2,6-diethoxy-di-β-hydroxyethylaniline | Do. |
| 2,4-dinitro-6-bromoaniline | 2,6-dimethoxy-β-hydroxyethylaniline | Red. |
| Do | 2,6-dimethoxy-di-β-hydroxyethylaniline | Purple. |
| Do | 2,6-diethoxy-di-β-hydroxyethylaniline | Do. |
| p-Nitroaniline (A) | (structure with $OC_2H_4OH$, $C_3H_7$, $C_2H_4OH$, $OC_2H_4OH$ substituents on aniline N) | Red. |
| p-Nitroaniline (B) | (structure with $OC_2H_4OCH_3$, $C_2H_5$, $C_2H_4OCH_3$, $OC_2H_4OCH_3$ substituents on aniline N) | Do. |
| p-Nitroaniline (C) | (structure with $OC_2H_4OCH_3$, $CH_3CHOHCH_2OH$, $C_2H_4OC_2H_4OH$, $OCH_2CH_2CH_3$ substituents on aniline N) | Do. |
| p-Nitro-o-chloroaniline | A, B and C above | Rubine. |
| 2,4-dinitroaniline | A, B and C above | Purple. |
| 2,4,6-trinitroaniline | A, B and C above | Blue. |

In employing the aryl azo derivatives of our invention as dyes, they will ordinarily be applied to the material in the form of an aqueous suspension which can be prepared by grinding the dye to a paste in the presence of soap or other suitable dispersing agent and dispersing the resulting paste in water. Dyeing operations can, with advantage, be conducted at a temperature of 80–85° C., but any suitable temperature may be of the dye include soap, sulphoricinoleic acid, salts of sulphoricinoleic acid, and sulfonated oleic, stearic or palmitic acid, or salts thereof, such for instance as the sodium or ammonium salts.

While it is preferred to effect coloration by applying the dye compound from an aqueous dye bath directly to the material to be colored, the azo compounds of our invention may be applied employing the methods applicable to the so-called ice colors. Briefly, in accordance with this method of dyeing, the amine is absorbed and diazotized on the fiber, after which the dye is formed in situ by developing with a coupling agent, such as disclosed herein. Conversely, the material undergoing dyeing may first be treated to absorb a coupling agent and the dye subsequently formed in situ by coupling with an aryl diazonium salt.

The following example illustrates one satisfactory way in which dyeing may be carried out in accordance with our invention. Quantities are expressed in parts by weight.

EXAMPLE 7

2.5 parts of the compound formed by coupling 2,6-dimethoxy-di-β-hydroxyethylaniline with diazotized 2,4-dinitroaniline are finely ground with soap, sodium oleate, for example, and dispersed in 1000 parts of water. The dispersion thus prepared is heated to a temperature approximating 45–55° C. and 100 parts of cellulose acetate silk, in the form of yarn, thread or cloth, for example, are added to the dyebath, after which the temperature is gradually raised to 80–85° C. and the silk worked for several hours at this temperature. Upon completion of the dyeing operation, the cellulose acetate silk is removed, washed with soap, rinsed and dried. The cellulose acetate silk is dyed a scarlet shade.

It will be understood that dyeing operations can be carried out in a manner similar to that described above by the substitution of another organic derivative of cellulose material for cellulose acetate silk or by employing a dye compound of the invention other than that employed in the example, or by substitution of both the material being dyed and the dye compound of the example.

We claim:

1. The aryl azo derivatives of compounds having the general formula:

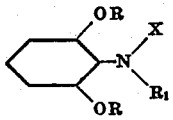

wherein R and R₁ each represent a member selected from the group consisting of an alkyl group, a hydroxyalkyl group and an alkoxyalkyl group and X represents a member selected from the group consisting of hydrogen, an alkyl group, a hydroxyalkyl group and an alkoxyalkyl group.

2. An azo compound having the general formula:

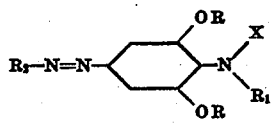

wherein R and R₁ each represent a member selected from the group consisting of an alkyl group, a hydroxyalkyl group and an alkoxyalkyl group, X represents a member selected from the group consisting of hydrogen, an alkyl group, a hydroxyalkyl group and an alkoxyalkyl group and R₂ represents an aryl nucleus.

3. An azo compound having the general formula:

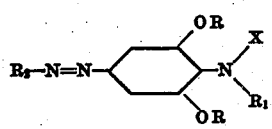

wherein R and R₁ each represent a member selected from the group consisting of an alkyl group, a hydroxyalkyl group and an alkoxyalkyl group, X represents a member selected from the group consisting of hydrogen, an alkyl group, a hydroxyalkyl group and an alkoxyalkyl group and R₂ represents a nuclear non-sulfonated aryl nucleus.

4. An azo compound having the general formula:

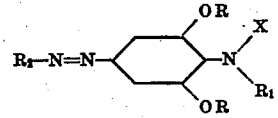

wherein R and R₁ each represent a member selected from the group consisting of an alkyl group, a hydroxyalkyl group and an alkoxyalkyl group, X represents a member selected from the group consisting of hydrogen, an alkyl group, a hydroxyalkyl group and an alkoxyalkyl group and R₂ represents an aryl nucleus of the benzene series.

5. An azo compound having the general formula:

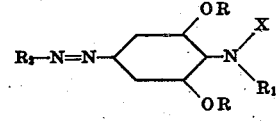

wherein R represents an alkyl group, R₁ represents a member selected from the group consisting of an alkyl group, a hydroxyalkyl group and an alkoxyalkyl group, X represents a member selected from the group consisting of hydrogen, an alkyl group, a hydroxyalkyl group and an alkoxyalkyl group and R₂ represents an aryl nucleus.

6. An azo compound having the general formula:

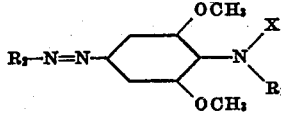

wherein R₁ represents a member selected from the group consisting of an alkyl group, a hydroxyalkyl group and an alkoxyalkyl group, X represents a member selected from the group consisting of hydrogen, an alkyl group, a hydroxyalkyl group and an alkoxyalkyl group and R₂ represents an aryl nucleus of the benzene series.

7. An azo compound having the formula:

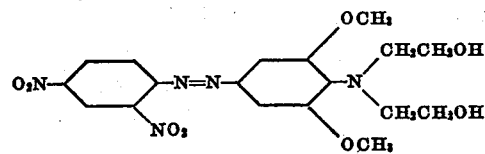

8. An azo compound having the formula:

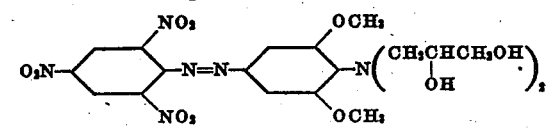

9. A process of coloring organic derivatives of cellulose which comprises applying thereto a dye selected from the class of azo compounds having the general formula:

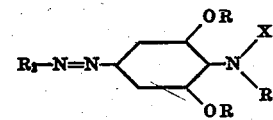

wherein R and R₁ each represents a member selected from the group consisting of an alkyl group, a hydroxyalkyl group and an alkoxyalkyl group, X represents a member selected from the group consisting of hydrogen, an alkyl group, a hydroxyalkyl group and an alkoxyalkyl group and R₂ represents a nuclear non-sulfonated aryl nucleus.

10. A process of coloring organic acid esters of cellulose which comprises applying thereto a dye selected from the class of azo compounds having the general formula:

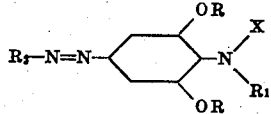

wherein R and R₁ each represent a member selected from the group consisting of an alkyl group, a hydroxyalkyl group and an alkoxyalkyl group, X represents a member selected from the group consisting of hydrogen, an alkyl group, a hydroxyalkyl group and an alkoxyalkyl group and R₂ represents a nuclear non-sulfonated aryl nucleus.

11. A process of coloring organic acid esters of cellulose which comprises applying thereto a dye selected from the class of azo compounds having the general formula:

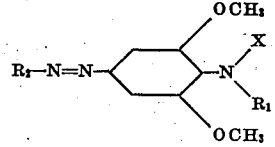

wherein R₁ represents a member selected from the group consisting of an alkyl group, a hydroxyalkyl group and an alkoxyalkyl group, X represents a member selected from the group consisting of hydrogen, an alkyl group, a hydroxyalkyl group and an alkoxyalkyl group and R₂ represents a nuclear non-sulfonated aryl nucleus of the benzene series.

12. A process of coloring a cellulose acetate which comprises applying thereto a dye selected from the class of azo compounds having the general formula:

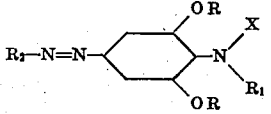

wherein R and R₁ each represent a member selected from the group consisting of an alkyl group, a hydroxyalkyl group and an alkoxyalkyl group, X represents a member selected from the group consisting of hydrogen, an alkyl group, a hydroxyalkyl group and an alkoxyalkyl group and R₂ represents a nuclear non-sulfonated aryl nucleus.

13. A process of coloring a cellulose acetate which comprises applying thereto a dye selected from the class of azo compounds having the general formula:

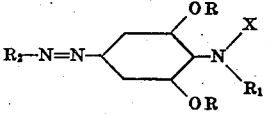

wherein R₁ represents a member selected from the group consisting of an alkyl group, a hydroxyalkyl group and an alkoxyalkyl group, X represents a member selected from the group consisting of hydrogen, an alkyl group, a hydroxyalkyl group and an alkoxyalkyl group and R₂ represents a nuclear non-sulfonated aryl nucleus of the benzene series.

14. Material containing an organic derivative of cellulose colored with a dye selected from the class of azo compounds having the general formula:

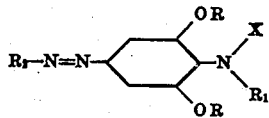

wherein R and R₁ each represent a member selected from the group consisting of an alkyl group, a hydroxyalkyl group and an alkoxyalkyl group, X represents a member selected from the group consisting of hydrogen, an alkyl group, a hydroxyalkyl group and an alkoxyalkyl group and R₂ represents an aryl nucleus.

15. Material containing an organic acid ester of cellulose colored with a dye selected from the class of azo compounds having the general formula:

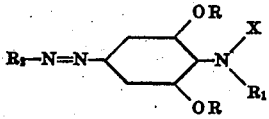

wherein R and R₁ each represent a member selected from the group consisting of an alkyl group, a hydroxyalkyl group and an alkoxyalkyl group, X represents a member selected from the group consisting of hydrogen, an alkyl group, a hydroxyalkyl group or an alkoxyalkyl group and R₂ represents an aryl nucleus.

16. Material containing an organic acid ester of cellulose colored with a dye selected from the class of azo compounds having the general formula:

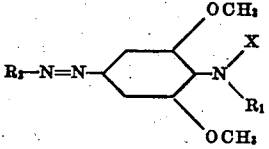

wherein R₁ represents a member selected from the group consisting of an alkyl group, a hydroxyalkyl group and an alkoxyalkyl group, X represents a member selected from the group consisting of hydrogen, an alkyl group, a hydroxyalkyl group and an alkoxyalkyl group and R₂ represents an aryl nucleus of the benzene series.

17. A cellulose acetate colored with a dye selected from the class of azo compounds having the general formula:

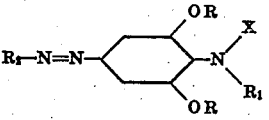

wherein R and R₁ each represent a member selected from the group consisting of an alkyl group, a hydroxyalkyl group and an alkoxyalkyl group, X represents a member selected from the group consisting of hydrogen, an alkyl group, a hydroxyalkyl group and an alkoxyalkyl group and R₂ represents an aryl nucleus.

18. A cellulose acetate colored with a dye selected from the class of azo compounds having the general formula:

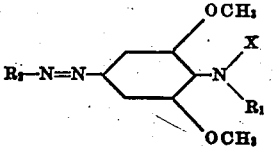

wherein $R_1$ represents a member selected from the group consisting of an alkyl group, a hydroxyalkyl group and an alkoxyalkyl group, X represents a member selected from the group consisting of hydrogen, an alkyl group, a hydroxyalkyl group and an alkoxyalkyl group and $R_2$ represents an aryl nucleus of the benzene series.

19. A process of preparing aryl azo derivatives of compounds having the general formula:

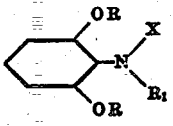

wherein R and $R_1$ each represent a member selected from the group consisting of an alkyl group, a hydroxyalkyl group and an alkoxyalkyl group and X represents a member selected from the group consisting of hydrogen, an alkyl group, a hydroxyalkyl group and an alkoxyalkyl group which comprises diazotizing a primary arylamine and coupling the diazotized primary arylamine in an acid medium with a compound corresponding to said general formula.

JAMES G. McNALLY.
JOSEPH B. DICKEY.